United States Patent
Kozlowski et al.

(10) Patent No.: US 7,478,969 B2
(45) Date of Patent: Jan. 20, 2009

(54) SPLINE ARRANGEMENT FOR ROTATABLY COUPLING TWO MEMBERS

(75) Inventors: Keith A. Kozlowski, Saginaw, MI (US); Leland N. Olgren, Frankenmuth, MI (US)

(73) Assignee: Delphi Technologies, Inc, Troy, MI (US)

( * ) Notice: Subject to any disclaimer, the term of this patent is extended or adjusted under 35 U.S.C. 154(b) by 83 days.

(21) Appl. No.: 11/341,766

(22) Filed: Jan. 27, 2006

(65) Prior Publication Data

US 2007/0177939 A1    Aug. 2, 2007

(51) Int. Cl.
*F16C 3/00*    (2006.01)
(52) U.S. Cl. ............ 403/359.6; 403/359.2; 403/359.5
(58) Field of Classification Search ............ 403/359.1, 403/359.2, 359.3, 359.5, 359.6; 464/182
See application file for complete search history.

(56) References Cited

U.S. PATENT DOCUMENTS

| | | | |
|---|---|---|---|
| 1,779,805 A | 10/1930 | Dunwoodie | |
| 1,803,995 A | 5/1931 | Chilton | |
| 3,222,772 A | 12/1965 | Leyner | |
| 3,360,961 A | 1/1968 | Steiner | |
| 3,399,549 A | 9/1968 | Nagele | |
| 3,865,500 A | 2/1975 | Newell | |
| 4,115,022 A * | 9/1978 | Orain | 403/359.6 |
| 4,175,404 A | 11/1979 | Schopf | |
| 4,292,001 A * | 9/1981 | Snell | 403/359.5 |
| 4,395,247 A | 7/1983 | Roberts | |
| 4,875,796 A | 10/1989 | Storm | |
| 4,881,842 A | 11/1989 | Farrell et al. | |
| 5,503,494 A | 4/1996 | Kamata et al. | |
| 5,527,126 A | 6/1996 | Digel et al. | |
| 5,533,825 A | 7/1996 | Stone | |
| 5,647,683 A | 7/1997 | Easley | |
| 6,482,094 B2 | 11/2002 | Kefes | |
| 7,288,029 B1 * | 10/2007 | Lyon et al. | 403/359.6 |

* cited by examiner

*Primary Examiner*—Michael P Ferguson
(74) *Attorney, Agent, or Firm*—Law Offices of Brian C. Pauls

(57) ABSTRACT

A rotatable combination that includes first and second members respectively having first and second longitudinally extending pluralities of splines. The second plurality of splines extend substantially parallel to the rotational axis. The first plurality of splines includes first and second longitudinally extending sections having different orientations with the second longitudinal section defining an angle with the rotational axis. The first longitudinal section engages the second plurality of splines before the second longitudinal section during assembly of the two members. Engagement of the second longitudinal section with the second plurality of splines generates a greater resistance to longitudinal movement than engagement of the first longitudinal section with the second plurality of splines. Engagement of the second longitudinal section with the second plurality of splines rotationally couples the first and second members in a backlash-free engagement and may be advantageously employed with a constant velocity joint.

19 Claims, 3 Drawing Sheets

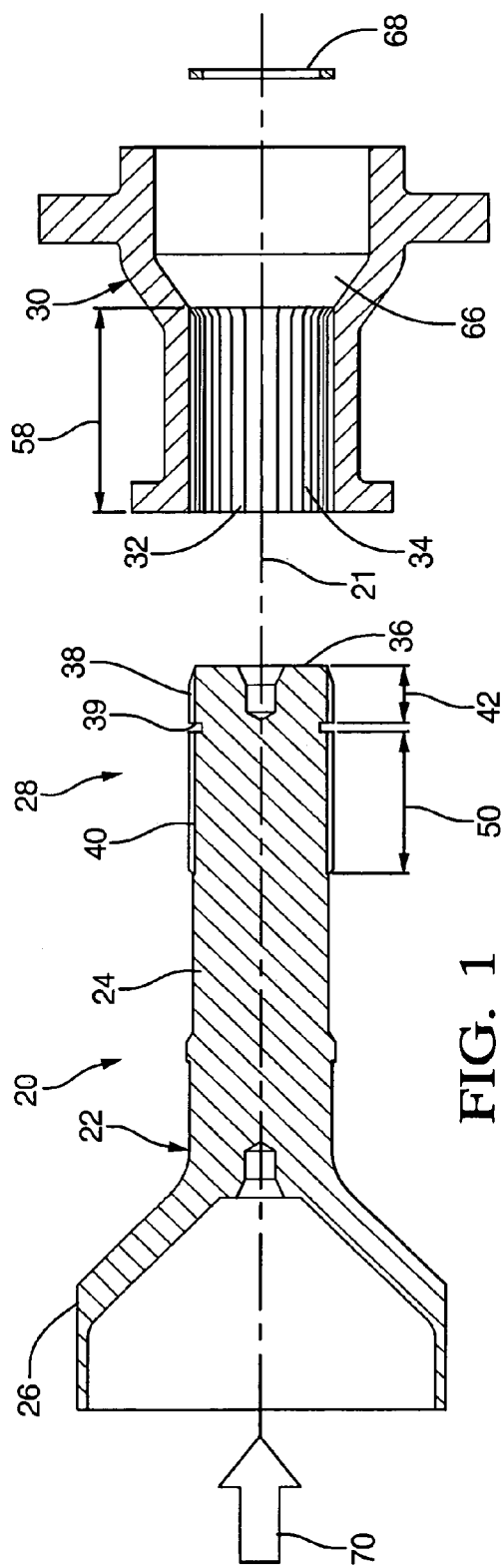
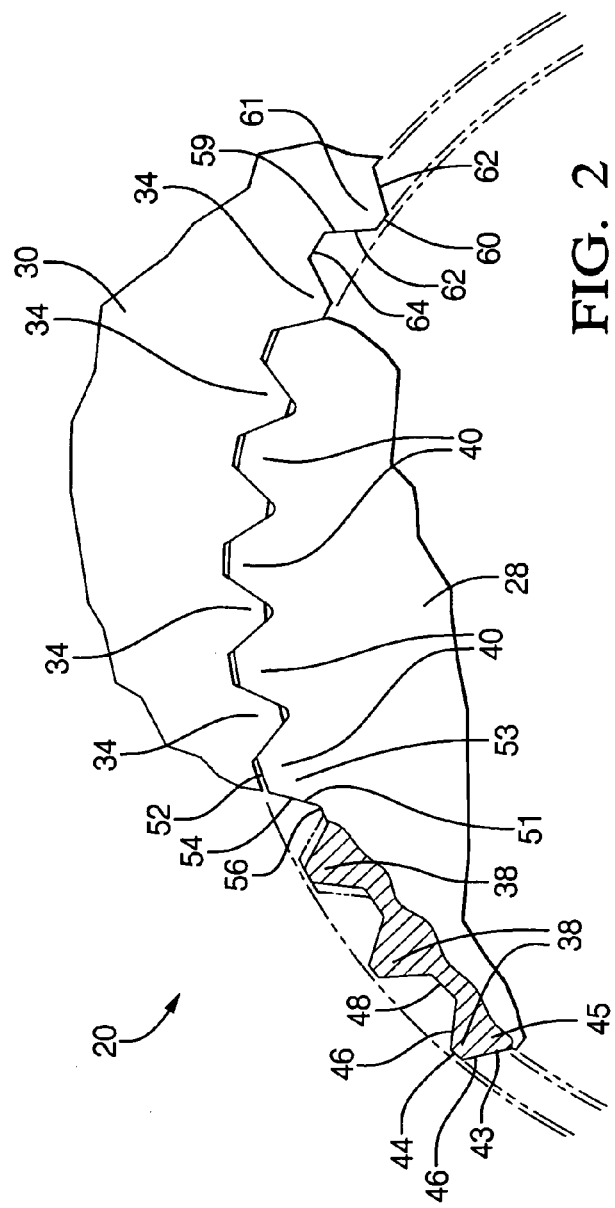
FIG. 1
FIG. 2

SPLINE ARRANGEMENT FOR ROTATABLY COUPLING TWO MEMBERS

BACKGROUND OF THE INVENTION

1. Field of the Invention

The present invention relates to spline arrangements and, more specifically, a spline arrangement for rotatably coupling two members.

2. Description of the Related Art

It is well known to use splines to rotatably couple two separate members. A well known application of such a use of splines is found in front wheel drive automobiles. The transaxle assembly of such automobiles is often connected to the driven front wheels of the vehicle using two half shafts with constant velocity ("CV") joints located at each end of the two half shafts. The CV joints typically include a shaft stub on the outer race having a male splined member that is used to couple the CV joint to either a side gear of the transaxle or a wheel hub. Both the side gear and wheel hub include a female splined opening for engaging the shaft stub of the CV joint. The two ends of the half shaft generally define male splines which are engaged with a female splined opening on the inner race of the CV joint. These splined connections transmit torque from the transaxle to the front wheels and it is undesirable for any of these splined connections to have any backlash or rotational play.

To prevent such backlash, it is common to dimension the splines so that they must be press-fit into engagement and are subject to elastic deformation by the press fit engagement. It is also common to dispose one set of the splines, typically the male splines, at a small helical angle while leaving the other set of splines parallel to the rotational axis to increase the interference between the two sets of splines when they are press fit together. While such use of "oversize" splines together with a helix angle has proven effective in rotationally coupling the CV joints in an acceptable backlash-free engagement, the press force required to engage the splines can be substantial and properly rotationally aligning the "oversize" splines when initiating their engagement can present difficulties during assembly.

SUMMARY OF THE INVENTION

The present invention provides a spline arrangement that can be used to securely couple two members together in a backlash-free engagement wherein the splines are relatively easily rotationally aligned when initiating the press fit engagement of the splined members.

The invention comprises, in one form thereof, a rotatable combination that defines a longitudinally extending rotational axis and includes first and second members. The first member has a first longitudinally extending plurality of splines and the second member has a second longitudinally extending plurality of splines which extend substantially parallel to the rotational axis. The first plurality of splines includes a first longitudinally extending section and a second longitudinally extending section. The first longitudinal section defines a first orientation relative to the rotational axis and the second longitudinal section defines a second orientation relative to the rotational axis. The second orientation differs from the first orientation and defines a substantially constant angle with the rotational axis. The first longitudinal section is positioned to engage the second plurality of splines prior to engagement of the second longitudinal section with the second plurality of splines during assembly of the first and second members. Engagement of the first longitudinal section with the second plurality of splines defines a first resistance to relative longitudinal movement between the first and second members and engagement of the second longitudinal section with the second plurality of splines defines a second resistance to relative longitudinal movement between the first and second members. The second resistance is greater than the first resistance for a common interdigitated longitudinal length. The engagement of the second longitudinal section with the second plurality of splines rotatably drivingly couples the first and second members in a substantially backlash-free engagement.

The invention comprises, in another form thereof, a rotatable combination that defines a longitudinally extending rotational axis and includes a shaft and a body. The shaft is disposed coaxially with the rotational axis and defines a distal end. The shaft also includes a first plurality of longitudinally extending and circumferentially spaced splines which project radially outwardly from the shaft. The body defines a substantially cylindrical opening that is disposed coaxially with the rotational axis. The body also includes a second plurality of longitudinally extending and circumferentially spaced splines which project radially inwardly within the opening and extend substantially parallel to the rotational axis. The first plurality of splines include a first longitudinally extending section and a second longitudinally extending section. The first longitudinal section defines a first orientation relative to the rotational axis and the second longitudinal section defines a second orientation relative to the rotational axis wherein the second orientation differs from the first orientation and defines a substantially constant angle with the rotational axis. The distal end of the shaft is insertable into the opening to thereby engage the first and second plurality of splines. The first longitudinal section is positioned between the second longitudinal section and the distal end and, thus, engages the second plurality of splines before the second longitudinal section when inserting the shaft into the body. The engagement of the first longitudinal section with the second plurality of splines defines a first resistance to relative longitudinal movement between the shaft and body and engagement of the second longitudinal section with the second plurality of splines defines a second resistance to relative longitudinal movement between the shaft and body. The second resistance is greater than the first resistance for a common interdigitated longitudinal length. The engagement of the second longitudinal section with the second plurality of splines rotatably drivingly couples the shaft and body in a substantially backlash-free engagement.

The invention comprises, in still another form thereof, a method of rotatably coupling a first member with a second member wherein the first and second members define a longitudinally extending rotational axis. The method includes providing the first member with a first plurality of splines wherein the first plurality of splines include a first longitudinally extending section and a second longitudinally extending section. The first longitudinal section defines a first orientation relative to the rotational axis and the second longitudinal section defines a second orientation relative to the rotational axis wherein the second orientation differs from the first orientation and defines a substantially constant angle with the rotational axis. The second member is provided with a second plurality of splines wherein the second plurality of splines extend substantially parallel to the rotational axis. The method also includes coaxially positioning the first and second members, rotationally aligning the first and second members by engaging the first longitudinal section of the first plurality of splines with the second plurality of splines, and applying a first longitudinally directed force to the first and second members to longitudinally slide the first member relative to the second member while the first longitudinal section is engaged with the second plurality of splines to bring the second longitudinal section into engagement with the second plurality of splines. A second longitudinally directed force is applied to the first and second members while the second longitudinal section is engaged with the second plurality of splines to bring a substantial portion of the longitudinal length of the second longitudinal section into engagement with the second plurality of splines wherein the second longitudinally directed force is greater than the first longitudinally directed force and engagement of the substantial portion of the longitudinal length of the second longitudinal section with the second plurality of splines rotatably drivingly couples the first and second members in a substantially backlash-free engagement.

An advantage of the present invention is that it provides a first and second plurality of splines that are relatively easily rotationally aligned and initially engaged prior to securely coupling the first and second pluralities of splines in a press-fit engagement which does not allow for rotational backlash between the two pluralities of splines. While the spline arrangements disclosed herein can be advantageously used to rotationally couple either the male or female splines of a CV joint to another member, the application of the present invention is not limited to CV joints and the spline arrangements disclosed herein may be advantageously employed with other assemblies where it is desirable to rotationally couple two members in a substantially backlash-free engagement.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 1 is a cross sectional exploded view of two rotatable members in accordance with the present invention.

FIG. 2 is a partial cross sectional schematic view of the interdigitated splines of the two members of FIG. 1.

Figure 3:
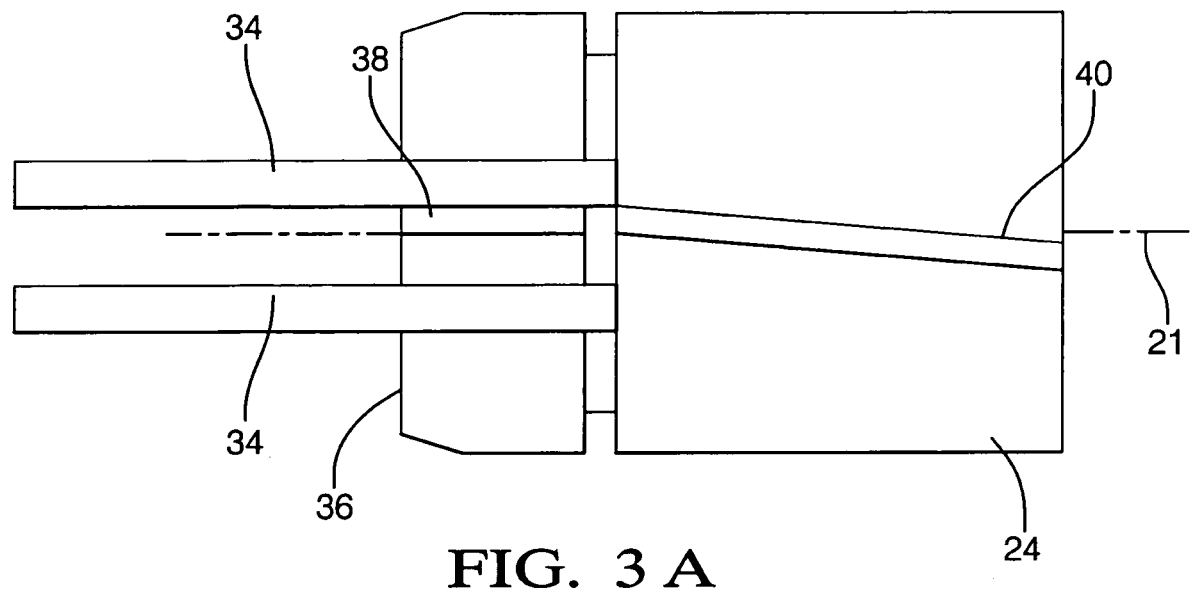
FIG. 3A is a schematic depiction of a first embodiment of the two rotatable members with their splines partially engaged.
FIG. 3B is a schematic depiction of a second embodiment of the two rotatable members with their splines partially engaged.
Figure 3:
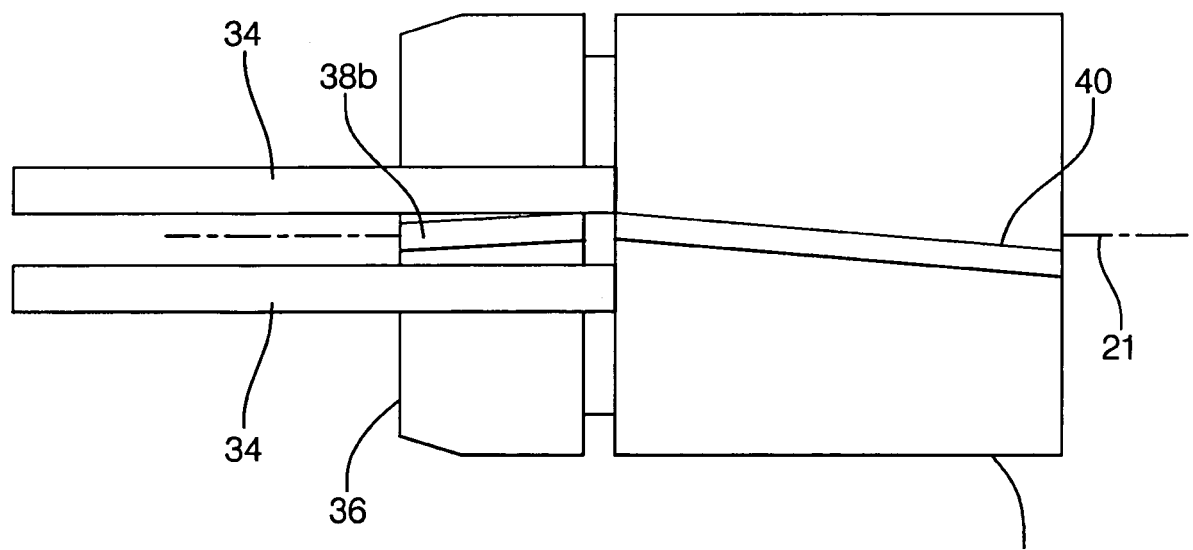

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

A rotatable combination 20 defining a rotational axis 21 in accordance with the present invention is shown in FIG. 1. Combination 20 includes a first member 22 which takes the form of a stub shaft 24 extending from an attachment bell 26. Attachment bell 26 is used to secure first member 22 to the end of a half-shaft (not shown) of a front wheel drive vehicle. A first plurality of longitudinally extending splines 28 are located on shaft 24 of first member 22.

Combination 20 also includes a second member or body 30 which, in the illustrated embodiment, takes the form of an inner race of a CV joint. Body 30 of the second rotatable member defines a substantially cylindrical opening 32 with a second plurality of splines 34 located therein. This second plurality of splines 34 are female splines circumferentially spaced about the perimeter of opening 32 and projecting radially inwardly into opening 32. Cylindrical opening 34 is disposed coaxially with rotational axis 21 and the second plurality of splines 34 extend longitudinally in a direction that is substantially parallel with rotational axis 21.

Shaft 28 is also disposed coaxially with rotational axis 21 and, during assembly of combination 20, distal end 36 of shaft 28 is inserted into opening 34 to engage the first plurality of male splines 28 with the second plurality of female splines 34. As best seen in FIGS. 1 and 2, the first plurality of splines 28 is located on shaft 24 and the splines of this first plurality 28 extend longitudinally, are spaced circumferentially about the outer perimeter of shaft 24 and project radially outwardly from shaft 24.

The first plurality of splines 28 located on shaft 24 are subdivided into two separate longitudinal sections 38, 40. In the illustrated embodiment, a circumferentially extending slot 39 longitudinally separates the first and second sections 38, 40. The first longitudinal section 38 is located between the second longitudinal section 40 and distal end 34. When assembling combination 20, the first longitudinal section of splines 38 engages the second plurality of splines 34 located in opening 32 prior to the engagement of the second longitudinal section of splines 40. This initial engagement between the first longitudinal section of splines 38 with the second plurality of splines 34 in opening 32 rotationally aligns the two pluralities of splines 28, 34 prior to the press-fit engagement of the second longitudinal section 40 with the second plurality of splines 34.

As best understood with reference to FIG. 2, the first section 38 of splines 28 is sized and shaped to be more readily interfitted with second plurality of splines 34 than the second section 40 of splines 28 which are sized and shaped to provide a press-fit engagement with splines 34 that elastically deforms splines 28 and 34. It is the press-fit engagement between second section 40 of splines 28 and splines 34 which drivingly engages shaft 24 with body 30 in a substantially back-lash free manner.

In the illustrated embodiment, the splines of the second longitudinal section 40 have the following properties: (1) fillet root side fit: Class 5 (f=1.00); (2) number of teeth=29; (3) spline pitch=32/64; (4) pressure angle (deg.)=37.5; (5) pitch diameter=23.01875 mm; (6) major diameter=23.663/23.409 mm; (7) form diameter (max)=22.283 mm; (8) minor diameter=21.986/21.783 mm; (9) dimension over 2 gage pins (REF)=25.579/25.529 mm; (10) fillet radius (min.)=0.149 mm; (11) effective circular tooth thickness=1.455/ 1.405 mm; (12) min. actual circular tooth thickness=1.384 mm; (13) right hand helix angle (minutes of one degree)=approx. 16; (14) gage pin diameter=1.524 mm. The splines of the first longitudinal section 38 have the following properties: ($1_{38}$) fillet root side fit: Class 5 (f=1.00); ($2_{38}$) number of teeth=29; ($3_{38}$) spline pitch=32/64; ($4_{38}$) pressure angle (deg.)=37.5; ($5_{38}$) pitch diameter=23.01875 mm; ($6_{38}$) major diameter=23.663/23.409 mm; ($7_{38}$) form diameter (max)=22.283 mm; ($8_{38}$) minor diameter=21.986/21.783 mm; ($9_{38}$) dimension over 2 gage pins (REF)=25.421/25.371 mm; ($10_{38}$) fillet radius (min.)=0.268 mm; ($11_{38}$) effective circular tooth thickness=1.326/1.276 mm; ($12_{38}$) min. actual circular tooth thickness=1.255 mm; ($13_{38}$) No helix angle; ($14_{38}$) gage pin diameter=1.524 mm. Splines 34 and properties (1) through (5) and (14) of second longitudinal section 40 are in general accordance with ANSI Standard B92.1. Properties (6) through (13), however, represent departures from ANSI Standard B92.1 and these departures are for the primary purpose of enhancing the interference fit between second longitudinal section 40 and splines 34 to thereby provide a substantially backlash-free engagement between splines 34 and second longitudinal section 40.

FIG. 2 is a fragmentary and schematic cross sectional view of shaft 24 and body 30 illustrating the interengagement of splines 28 and splines 34. As noted above, first longitudinal section 38 of splines 28 is inserted into opening 32 and engaged with splines 34 before second longitudinal section 40 of splines 28 enters opening 32 and is engaged with splines 34. In the illustrated embodiment, there is a one-to-one relationship between the splines in the first and second longitudinal sections 38, 40. In other words, there is a single spline in first longitudinal section 38 for each spline in second longitudinal section 40.

In the first longitudinal section 38, the splines have a relatively smaller size than the splines in the second longitudinal section 40. This allows the first longitudinal section 38 to be more easily inserted between splines 34 located in opening 32. Once the splines of the first longitudinal section 38 have been positioned between splines 34, i.e., the first longitudinal section has been interdigitated with splines 34, the relatively larger second longitudinal section 40 will be properly rotationally aligned for engagement with splines 34.

This difference in size of the first and second longitudinal sections 38, 40 is schematically depicted in FIG. 2. The splines and relative sizes of the splines depicted in FIG. 2 are not drawn to scale. Instead, FIG. 2 has drawn to highlight particular aspects of the splines to facilitate the understanding of the present invention. It is also noted that only a limited number of the splines have been drawn and that the exemplary embodiment includes splines 28 and 34 that are evenly circumferentially distributed about the entire circumference of shaft 28 and opening 34 respectively.

In FIG. 2, three splines projecting radially outwardly from shaft 28 have been provided with cross-hatching, these three splines represent the splines of first longitudinal section 38. Splines 38 of the first longitudinal section have a spline profile 43 which is defined by distal surfaces 44, flank surfaces 46 and proximal surfaces 48. Splines 38 define a first cross sectional area 45 located circumferentially between opposed flank surfaces 46 and located radially between circular circumferences defined by the distal and proximal surfaces 44, 48. Similarly, splines 40 of the second longitudinal section have a spline profile 51 which is defined by distal surfaces 52, flank surfaces 54, and proximal surfaces 56. Splines 40 define a second cross sectional area 53 located circumferentially between opposed flank surfaces 54 and located radially between circular circumferences defined by the distal and proximal surfaces 52, 56.

The profile 43 and cross sectional area 45 defined thereby of the splines of first longitudinal section 38 remain substantially constant for substantially all of the length 42 of first longitudinal section 38. Similarly, the profile 51 and cross sectional area 53 defined thereby of the splines of second longitudinal section 40 remain substantially constant for substantially all of the length 50 of second longitudinal section 40. As can be seen schematically in FIG. 2, the splines of the first and second longitudinal sections 38, 40 have a common spline height. In other words, the distal surfaces 44, 52 of each of the first and second longitudinal sections 38, 40 are located at the same radial distance from rotational axis 21 and the proximal surfaces 48, 56 of each of the first and second longitudinal sections 38, 40 are located at the same radial distance from rotational axis 21. The opposing flank surfaces 46 of the splines of first longitudinal section 38, however are relatively closer than the opposing flank surfaces 54 of the splines of the second longitudinal section 40. Consequently, cross sectional area 45 of the splines of first longitudinal section 38 is smaller than cross sectional area 53 of the splines of second longitudinal section 40 and the void for receiving splines 34 located between flank surfaces 46 is correspondingly larger than the void for receiving. splines 34 located between flank surfaces 54.

Splines 34 located on body 30 have a profile 59 which is defined by distal surfaces 60, flank surfaces 62 and base surfaces 64. Splines 34 define a cross sectional area 61 located circumferentially between opposed flank surfaces 62 and located radially between circular circumferences defined by the distal and base surfaces 60, 64. The profile 59 and cross sectional area 61 defined thereby of splines 34 remain substantially constant for substantially all of the length 58 of splines 34.

The smaller size of splines 28 in first longitudinal section 38 compared to the size of splines 28 in second longitudinal section 40 allows first longitudinal section 38 to be more easily interdigitated with splines 34 when inserting shaft 24 into opening 32. As can be seen in the schematic representation of FIGS. 3A, 4A and 5, first longitudinal section 38 has an orientation relative to rotational axis 21 that differs from the orientation of second longitudinal section 40 relative to rotational axis 21. More specifically, splines 28 in first longitudinal section 38 extend substantially parallel to rotational axis 21 while splines 28 in second longitudinal section 40 extend at a substantially constant angle relative to rotational axis 21 to thereby define a helical shape.

Figure 4:
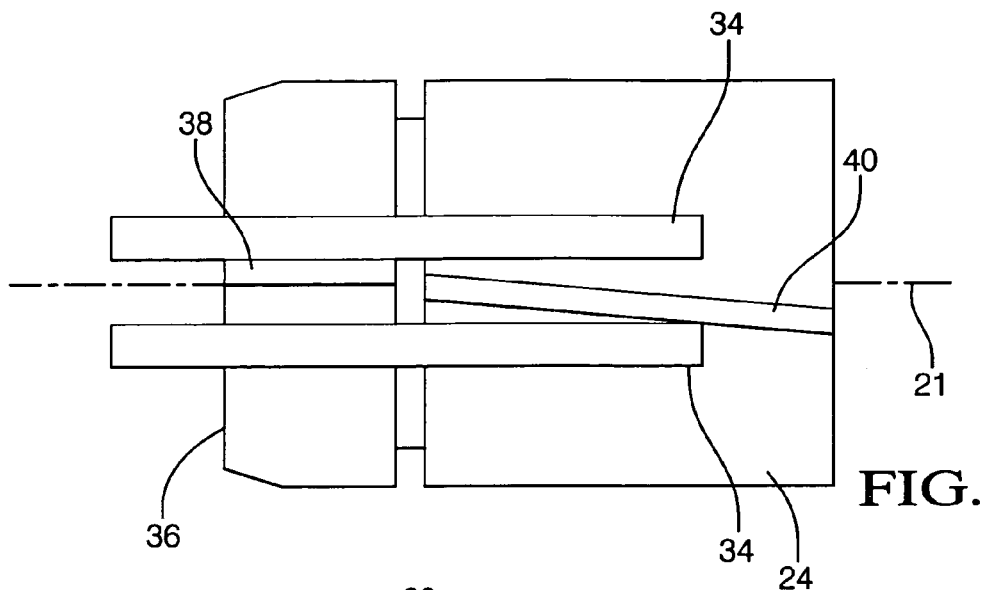
FIG. 4A is a schematic depiction of the first embodiment with the two members being more fully engaged than in FIG. 3A.
FIG. 4B is a schematic depiction of the second embodiment with the two members being more fully engaged than in FIG. 4A.
Figure 4:
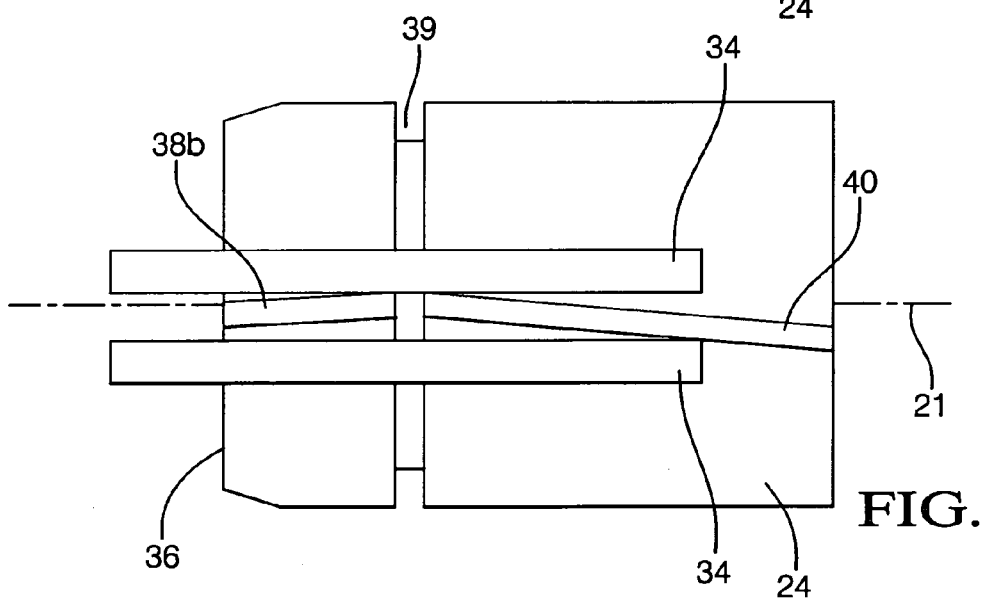

FIGS. 3B and 4B illustrate an embodiment where first longitudinal section 38b is positioned to define a substantially constant angle relative to rotational axis 21 and thus defines a helical shape. As can be seen in FIGS. 3B and 4B, the first and second longitudinal sections 38b, 40 are inclined in opposite directions relative to rotational axis 21. In other words, one of the sections is a "left-hand" helix while the other is a "right-hand" helix.

It is noted that FIGS. 3A, 3B, 4A, 4B and 5 are all highly schematic in nature and are presented to aid in the understanding of the present invention and not to accurately represent the physical structure of members 22, 30. The splines shown in these Figures have been simplified and the helical angle at which splines 38b and 40 extend have been greatly exaggerated so that such angles may be appreciated by the viewer. Additionally, it is noted that only two splines 34 and the first 38, 38b and second 40 longitudinal sections of only a single spline on shaft 24 are illustrated in FIGS. 3A, 3B, 4A, 4B and 5 for purposes of graphical clarity.

With regard to the illustrated embodiments, splines 28 forming second longitudinal section 40 define a right hand helix angle of 16+/−3 minutes of one degree. In the embodiment of FIGS. 3B and 4B, the splines forming first longitudinal section 38b define a left hand helix angle of a larger magnitude. The allowable size of the helix angle used with first longitudinal section 38b is dependent upon a number of factors including the axial length of first longitudinal section 38b (shorter sections allow for larger helix angles) and the relative size of first longitudinal section 38b compared to second longitudinal section 40 (smaller first longitudinal sections 38b allow for larger helix angles) and may range up to 6 degrees in some embodiments.

The assembly process will now be described. Initially, first and second members 22, 30 are positioned coaxially as represented in FIG. 1. The two members 22, 30 are rotationally aligned during the insertion of shaft 24 into opening 32 by the engagement of first longitudinal section 38 with the second plurality of splines 34. As schematically illustrated in FIGS. 3A and 3B, the engagement of first section 38 with splines 34 rotationally aligns the two members 22, 30 so that the larger splines of the second longitudinal section 40 will be properly positioned for a press fit engagement with splines 34.

When assembling members 22, 30, a longitudinally directed force, as represented by arrow 70, is applied to members 22, 30 to fully seat shaft 24 in opening 32. As discussed above, the splines of the first longitudinal section 38 are smaller than the splines of the second longitudinal section 40 with the first longitudinal section 38 relatively easily longitudinally sliding between splines 34 with only slight resistance and the second longitudinal section 40 defining a press-fit engagement that elastically deforms the splines of both second longitudinal section 40 and splines 34. Consequently, for a common interdigitated longitudinal length, the resistance to longitudinal movement resulting from the engagement of first section 38 or 38b and splines 34 is less than the resistance to longitudinal movement resulting from the engagement of second section 40 and splines 34. This greater resistance per length of second section 40 combined with the fact that a greater length of splines 34 will be engaged when second longitudinal section 40 is engaged with splines 34 requires the application of greater force 70 when second longitudinal section 40 is engaged with splines 34 than when only first longitudinal section 38 or 38b is engaged with splines 34.

After first longitudinal section 38 has been engaged with splines 34, a longitudinal force 70 is applied to members 22, 30 to bring the second longitudinal section 40 into engagement with the second plurality of splines 34. FIGS. 3A and 3B schematically illustrate the point at which first longitudinal section 38, 38b has been fully engaged with splines 34 and second longitudinal section 40 is just about to engage splines 34. At this point schematically depicted in FIGS. 3A and 3B, the engagement of first longitudinal section 38, 38b with splines 34 has rotationally aligned members 22, 30 so that second longitudinal section 40 is properly positioned for engagement with splines 34. The magnitude of longitudinal force 70 is then increased to force the engagement of second longitudinal section 40 with splines 34 and the application of a large force 70 is continued-until shaft 24 is properly seated in body 30 with a substantial majority of second longitudinal section 40 being engaged with splines 34 as depicted in FIG. 5.

When splines 34 begin to engage second longitudinal section 40, it is undesirable for the leading edge of second longitudinal section 40, i.e., the upper left corner of the sole illustrated spline 40 in FIGS. 3A, 3B, 4A, 4B and 5, to dig into and remove material from one of splines 34. FIG. 3A illustrates the situation where first longitudinal section 38 extends parallel to rotational axis 21. Splines 34 also extend parallel to rotational axis 21 and splines 34 and first longitudinal section 38 are likely to be in frictional contact along their respective flank surfaces for the entire length of the engagement between splines 34 and first longitudinal section 38 as depicted in FIG. 3A.

FIG. 4A schematically depicts a first longitudinal section 38b that defines a helical angle that is oriented opposite to the helical angle of second longitudinal section 40. Such a helical section 38b increases the manufacturing complexity of the assembly but provides advantages relative to the first longitudinal section 38 of FIG. 3A which extends parallel to rotational axis. The primary advantage of first longitudinal section 38b is that by providing first longitudinal section 38b with a helical angle that extends opposite to the helical angle of second longitudinal section 40, as longitudinal section 38b is further engaged with splines 34 longitudinal section 38b biases splines 34 in a direction which minimizes the potential for the leading edge of second longitudinal section 40 to dig into and undesirably gouge splines 34. Another advantage provided by first longitudinal section 38b is that it reduces the total surface area of frictional contact between first longitudinal section 38b and splines 34 relative to first longitudinal section 38 and, depending upon the size of the profile of first longitudinal section 38b and other factors influencing the interference between first longitudinal section 38b and splines 34, may thereby reduce the longitudinal force 70 required to longitudinally slide first longitudinal section 38b relative to splines 34.

Figure 5:
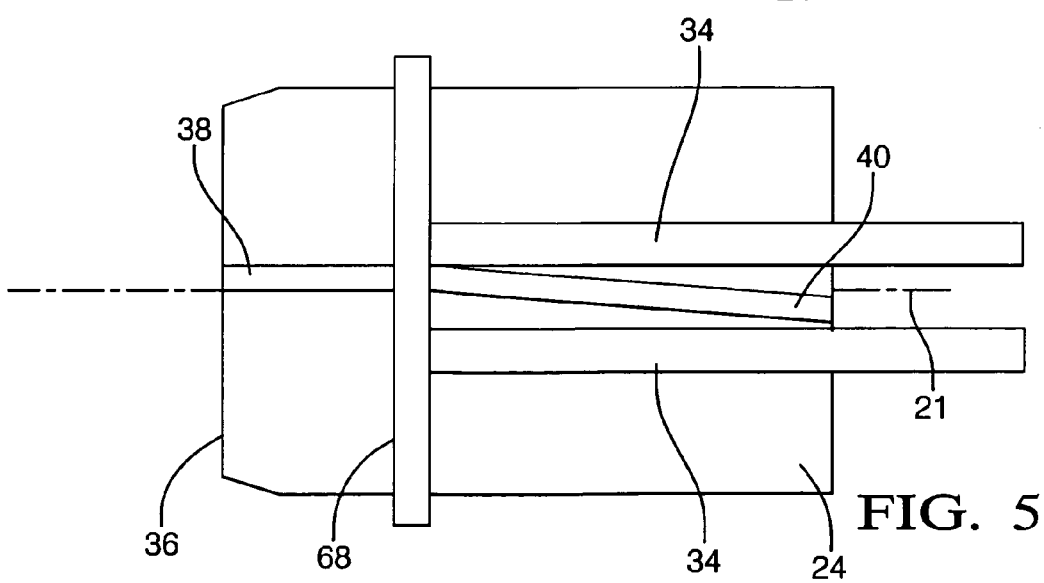
FIG. 5 is a schematic depiction of the first embodiment in a fully assembled condition.

FIG. 5 illustrates members 22, 30 after the application of a longitudinal force 70 has fully seated shaft 24 in opening 32 of body 30. In this fully seated position, a substantial portion of second longitudinal section 40 is engaged with second plurality of splines 34 to thereby rotatably drivingly couple the first and second members 22, 30 together in a substantially backlash-free engagement.

Slot 39 is machined into shaft 24 to facilitate the longitudinal securement of shaft 24 relative to body 30. In the illustrated embodiment, shaft 24 is inserted through opening 32 in body 30 until first longitudinal section 38 and slot 39 project beyond second plurality of splines 34 into the enlarged portion 66 of opening 32. A shoulder on shaft 24 which abuts body 30 adjacent the perimeter of opening 32 limits the extent to which shaft 24 can be inserted into opening 32. After slot 39 has been positioned in enlarged portion 66 of opening 32, a locking member 68, e.g., a conventional snap-ring, is positioned in slot 39 and has a portion that projects radially outwardly therefrom to prevent the longitudinal withdrawal of shaft 24 from opening 32. Alternative embodiments which do not employ a snap-ring may also be employed with the present invention. For example, in some embodiments, the friction fit between second longitudinal section 40 and splines 34 may be the sole means for longitudinally securing members 22, 30. Other methods of longitudinally securing the two members 22, 30 may also be employed.

Slot 39 not only provides a groove for receiving locking member 68 but also separates longitudinal sections 38, 40 of splines 28. This separation of the two differing spline sections 38, 40 is not required for the present invention and alternative embodiments may utilize spline sections 38, 40 that are not longitudinally separated. The use of slot 39 to longitudinally separate sections 38, 40, however, can facilitate the efficient manufacture of the two differing spline sections 38, 40 by eliminating the junction between the two different spline sections. Illustrated members 22 and 30 are formed out of conventional materials and can be manufactured using techniques well-known to those having ordinary skill in the art.

341 It is additionally noted that while the illustrated embodiments have the first 38, 38b and second 40 longitudinal sections forming male splines on shaft 24 and the second plurality of splines 34 forming female splines within opening 32 of body 30, alternative embodiments could reverse this configuration with the female splines being formed out of two longitudinal sections having differing profiles and orientations relative to the rotational axis of the assembly.

While this invention has been described as having an exemplary design, the present invention may be further modified within the spirit and scope of this disclosure. This application is therefore intended to cover any variations, uses, or adaptations of the invention using its general principles.

What is claimed is:

1. A rotatable combination, said combination defining a longitudinally extending rotational axis and comprising:
   a first member having a first longitudinally extending plurality of splines;
   a second member having a second longitudinally extending plurality of splines, said second plurality of splines extending substantially parallel to said rotational axis;
   wherein said first plurality of splines include a first longitudinally extending section and a second longitudinally extending section, said first longitudinal section defining a first orientation relative to said rotational axis and said second longitudinal section defining a second orientation relative to said rotational axis, said second orientation differing from said first orientation and defining a substantially constant angle with said rotational axis, said first longitudinal section positioned to engage said second plurality of splines prior to engagement of said second longitudinal section with said second plurality of splines during assembly of said first and second members;
   wherein engagement of said first longitudinal section with said second plurality of splines defines a first resistance to relative longitudinal movement between said first and second members and engagement of said second longitudinal section with said second plurality of splines defines a second resistance to relative longitudinal movement between said first and second members, said second resistance being greater than said first resistance for a common interdigitated longitudinal length; and
   wherein engagement of said second longitudinal section with said second plurality of splines rotatably drivingly couples said first and second members in a substantially backlash-free engagement; and
   wherein said first longitudinal section of said first plurality of splines extends at a substantially constant angle relative to said rotational axis, said first and second longitudinal sections being inclined in opposite directions relative to said rotational axis.

2. The combination of claim 1 wherein each of said first plurality of splines has a substantially constant first profile for substantially all of the longitudinal length of said first longitudinal section and a substantially constant second profile for substantially all of the longitudinal length of said second longitudinal section; and
   wherein each of said second plurality of splines has a substantially constant profile for substantially all of the longitudinal length of said second plurality of splines.

3. The combination of claim 2 wherein said second profile defines a greater cross sectional area than said first profile.

4. The combination of claim 3 wherein said first and second profiles each define a distal surface, said distal surfaces positioned at a substantially common radial distance from said rotational axis.

5. A rotatable combination, said combination defining a longitudinally extending rotational axis and comprising:
   a first member having a first longitudinally extending plurality of splines;
   a second member having a second longitudinally extending plurality of splines, said second plurality of splines extending substantially parallel to said rotational axis;
   wherein said first plurality of splines include a first longitudinally extending section and a second longitudinally extending section, said first longitudinal section defining a first orientation relative to said rotational axis and said second longitudinal section defining a second orientation relative to said rotational axis, said second orientation differing from said first orientation and defining a substantially constant angle with said rotational axis, said first longitudinal section positioned to engage said second plurality of splines prior to engagement of said second longitudinal section with said second plurality of splines during assembly of said first and second members;
   wherein engagement of said first longitudinal section with said second plurality of splines defines a first resistance to relative longitudinal movement between said first and second members and engagement of said second longitudinal section with said second plurality of splines defines a second resistance to relative longitudinal movement between said first and second members, said second resistance being greater than said first resistance for a common interdigitated longitudinal length; and
   wherein engagement of said second longitudinal section with said second plurality of splines rotatably drivingly couples said first and second members in a substantially backlash-free engagement; and
   wherein a circumferentially extending slot longitudinally separates said first and second longitudinal sections of said first plurality of splines.

6. The combination of claim 5 wherein said first longitudinal section of said first plurality of splines extends substantially parallel with said rotational axis.

7. The combination of claim 5 wherein said first longitudinal section of said first plurality of splines extends at a substantially constant angle relative to said rotational axis, said first and second longitudinal sections being inclined in opposite directions relative to said rotational axis.

8. The combination of claim 5 wherein each of said first plurality of splines has a substantially constant first profile for substantially all of the longitudinal length of said first longitudinal section and a substantially constant second profile for substantially all of the longitudinal length of said second longitudinal section; and
   wherein each of said second plurality of splines has a substantially constant profile for substantially all of the longitudinal length of said second plurality of splines.

9. The combination of claim 8 wherein said second profile defines a greater cross sectional area than said first profile.

10. The combination of claim 9 wherein said first and second profiles each define a distal surface, said distal surfaces positioned at a substantially common radial distance from said rotational axis.

11. A rotatable combination, said combination defining a longitudinally extending rotational axis and comprising:
    a shaft disposed coaxially with said rotational axis, said shaft defining a distal end and having a first plurality of longitudinally extending and circumferentially spaced splines, said first plurality of splines projecting radially outwardly from said shaft;
    a body defining a substantially cylindrical opening, said opening disposed coaxially with said rotational axis and having a second plurality of longitudinally extending and circumferentially spaced splines, said second plurality of splines projecting radially inwardly within said opening and extending substantially parallel to said rotational axis;
    wherein said first plurality of splines include a first longitudinally extending section and a second longitudinally extending section, said first longitudinal section defining a first orientation relative to said rotational axis and said second longitudinal section defining a second orientation relative to said rotational axis, said second orientation differing from said first orientation and defining a substantially constant angle with said rotational axis, said distal end of said shaft being insertable into said opening to thereby engage said first and second plurality of splines, said first longitudinal section positioned between said second longitudinal section and said distal end;

wherein engagement of said first longitudinal section with said second plurality of splines defines a first resistance to relative longitudinal movement between said shaft and said body and engagement of said second longitudinal section with said second plurality of splines defines a second resistance to relative longitudinal movement between said shaft and said body, said second resistance being greater than said first resistance for a common interdigitated longitudinal length; and wherein engagement of said second longitudinal section with said second plurality of splines rotatably drivingly couples said shaft and said body in a substantially backlash-free engagement; and wherein said first longitudinal section of said first plurality of splines extends at a substantially constant angle relative to said rotational axis, said first and second longitudinal sections being inclined in opposite directions relative to said rotational axis.

12. The combination of claim 11 wherein each of said first plurality of splines has a substantially constant first profile for substantially all of the longitudinal length of said first longitudinal section and a substantially constant second profile for substantially all of the longitudinal length of said second longitudinal section; and wherein each of said second plurality of splines has a substantially constant profile for substantially all of the longitudinal length of said second plurality of splines.

13. The combination of claim 12 wherein said second profile defines a greater cross sectional area than said first profile.

14. A method of rotatably coupling a first member with a second member wherein the first and second members define a longitudinally extending rotational axis, said method comprising:

providing the first member with a first plurality of splines, the first plurality of splines including a first longitudinally extending section and a second longitudinally extending section, the first longitudinal section defining a first orientation relative to the rotational axis and the second longitudinal section defining a second orientation relative to the rotational axis, the second orientation differing from the first orientation and defining a substantially constant angle with the rotational axis;

providing the second member with a second plurality of splines, the second plurality of splines extending substantially parallel to the rotational axis;

coaxially positioning the first and second members;

rotationally aligning the first and second members by engaging the first longitudinal section of the first plurality of splines with the second plurality of splines;

applying a first longitudinally directed force to the first and second members to longitudinally slide the first member relative to the second member while the first longitudinal section is engaged with the second plurality of splines to bring the second longitudinal section into engagement with the second plurality of splines;

applying a second longitudinally directed force to the first and second members while the second longitudinal section is engaged with the second plurality of splines to bring a substantial portion of the longitudinal length of the second longitudinal section into engagement with the second plurality of splines wherein the second longitudinally directed force is greater than the first longitudinally directed force and wherein engaging the substantial portion of the longitudinal length of the second longitudinal section with the second plurality of splines rotatably drivingly couples the first and second members in a substantially backlash-free engagement;

wherein the first member is a shaft and the second member defines an opening for receiving the shaft and the method further comprises the steps of:

placing a circumferentially extending slot on the shaft to longitudinally separate the first and second longitudinal sections of the first plurality of splines;

securing the first and second members by inserting the shaft through the opening wherein the first longitudinal section and slot project beyond the second plurality of splines and engaging the slot with a locking member to thereby prevent the longitudinal withdrawal of the shaft from the opening; and wherein said step of applying a second longitudinally directed force to the first and second members while the second longitudinal section is engaged with the second plurality of splines to bring a substantial portion of the longitudinal length of the second longitudinal section into engagement with the second plurality of splines is completed no later than an initial installation of the first and second members in a vehicle is completed and the installed first and second members transmit a rotational force in a substantially backlash-free engagement between the second longitudinal section and the second plurality of splines.

15. The method of claim 14 wherein the first member comprises a shaft and the first plurality of splines project radially outwardly from the shaft and the second member defines an opening, the second plurality of splines projecting radially inwardly from the second member within the opening.

16. The method of claim 14 wherein the first longitudinal section of the first plurality of splines extends substantially parallel with the rotational axis.

17. The method of claim 14 wherein the first longitudinal section of the first plurality of splines extends at a substantially constant angle relative to the rotational axis, the first and second longitudinal sections being inclined in opposite directions relative to the rotational axis.

18. The method of claim 14 wherein each of the first plurality of splines has a substantially constant first profile for substantially all of the longitudinal length of the first longitudinal section and a substantially constant second profile for substantially all of the longitudinal length of the second longitudinal section; and wherein each of the second plurality of splines has a substantially constant profile for substantially all of the longitudinal length of the second plurality of splines.

19. The method of claim 18 wherein each of the first and second profiles define a distal surface, the distal surfaces being positioned at a substantially common radial distance from the rotational axis and wherein the second profile defines a greater cross sectional area than the first profile.

* * * * *